INVENTOR
JOANNES A.W.J. VAN DOMMELEN
HIS ATTORNEY

Aug. 2, 1960   J. A. W. J. VAN DOMMELEN   2,947,577
DISENGAGING SOLIDS FROM A LIFT GAS
Filed Jan. 13, 1958   3 Sheets-Sheet 3

INVENTOR
JOANNES A.W.J. VAN DOMMELEN
BY
HIS ATTORNEY

United States Patent Office 2,947,577
Patented Aug. 2, 1960

2,947,577

DISENGAGING SOLIDS FROM A LIFT GAS

Joannes A. W. J. van Dommelen, Delft, Netherlands, assignor to Shell Oil Company, a corporation of Delaware Filed Jan. 13, 1958, Ser. No. 708,566

Claims priority, application Netherlands Jan. 15, 1957

12 Claims. (Cl. 302—59)

The invention relates to a disengaging apparatus for separating subdivided solids from a lift gas in which the solids are entrained, comprising a substantially bell-shaped catching hood having an enclosing side wall and a top closure, which hood is mounted with its open end turned downwards toward the upper end of the lift pipe from which the gas stream discharges so that the stream impinges against the top closure. Such disengagers are sometimes known as "inverted pot" separators and are herein called hood-type disengagers.

Hood-type disengagers are useful for separating various finely divided solids, such as dust, sand, grain, coal fines and catalyst particles, from a lift gas.

In the known types of hood-type disengagers the ascending gas which entrains the solid particles flows upwardly from the top of the riser or lift pipe into the catching hood, reverses flow direction upon impinging the top closure, and subsequently flows out of the hood around the lower edge thereof. As a result of the reversal of the flow direction of the gas in the hood the conveyed solid particles are hurled against the hood walls and thereafter fall downward through the bottom of the hood. During this fall, however, these particles pass through the current of gas which flows laterally under the bottom edge of the catching hood and some of these particles, particularly the lighter and smaller ones, are again entrained by the escaping gas. Consequently only the heavier and coarser particles remain separated from the gas stream. Other known devices which prevent the passage of the separated particles through the effluent gas have the drawback of presenting a high resistance to the gas stream.

A further drawback of known hood-type disengagers is that the relative dimensions of the lift pipe and the hood are often critical. Thus, it was found that the separating efficiency and the flow resistance to the gas stream are both significantly influenced by the relative diameters of the lift pipe and the enclosing wall of the catching hood.

It is the object of this invention to provide an improved gas-solids disengager of the hood-type wherein the solid particles which were separated within the hood by inertial action and fall downwards are prevented from being again entrained in the escaping gas, without increasing the flow resistance encountered by the gas stream to a high value.

A further object is to provide an improved gas-solids disengager wherein improved separating efficiency and reduced pressure losses are realized, and wherein the dimensions affect the separating efficiency and pressure loss to a smaller degree than in other constructions.

In summary, according to the invention, the catching hood, which is placed above the upper end of a lift pipe from which a lift gas and conveyed solids emerge upwards, is provided with a gas outlet at a level substantially below the top closure of the hood and a separate solids-discharge channel is provided for receiving the solids from the space within the hood at a level above the gas outlet and conducting the solids in at least partial isolation from the escaping gas to a lower level.

The solids-discharge channels are advantageously arranged about the lift pipe and situated to the outside of the flow space through which the gas first flows in leaving the hood.

In a preferred embodiment the discharge channel for the solid particles is defined by co-axial cylindrical walls of different diameters, the center lines of which are coincident with that of the lift pipe, so that the channel is annular in form. A downward extension of the side wall of the hood may, in this case, serve as one of the said cylindrical walls, advantageously forming the outer boundary of the annular channel.

After the gas in the catching hood has reversed its flow direction and the conveyed solid particles have been separated therefrom, the purified gas must escape from the hood. To this end a gas-discharge passageway is provided at a level, usually at the bottom of the hood, for discharge to the atmosphere or other unit of a plant. Various arrangements for such a discharge passageway may be used. Thus, they may be formed of a plurality of axially directed tubes which extend upwards through the top closure of the hood, preferably distributed at uniform angular intervals about the axis of the lift pipe to maintain symmetrical gas flow in the hood; or they may be arranged generally radially and extend out through the side wall of the hood, uniform peripheral distribution of the inlets to the tubes being again desirable.

By this arrangement the possibility of re-entrainment of the light, fine particles in the purified gas, although significantly reduced, is not entirely precluded. To separate also such re-entrained particles an after-separator, such as a cyclone, may be connected to the gas discharge passage.

According to another simple embodiment of the invention the solids-discharge channel includes at least one and, preferably, a plurality of vertical pipes distributed uniformly about the periphery of the hood, which are supplied with solids by an annular trough mounted on the inside of the side wall of the hood above the level of the gas discharge. The trough may be formed by a wall which is shaped as the frustum of a cone and joined to the hood side wall at the bottom by a floor, such as a flat annular plate; however, other designs of the trough are possible.

The invention will be further described with reference to the accompanying drawings forming a part of this specification and showing, by way of illustration, four preferred embodiments, in which.

Figure 1:
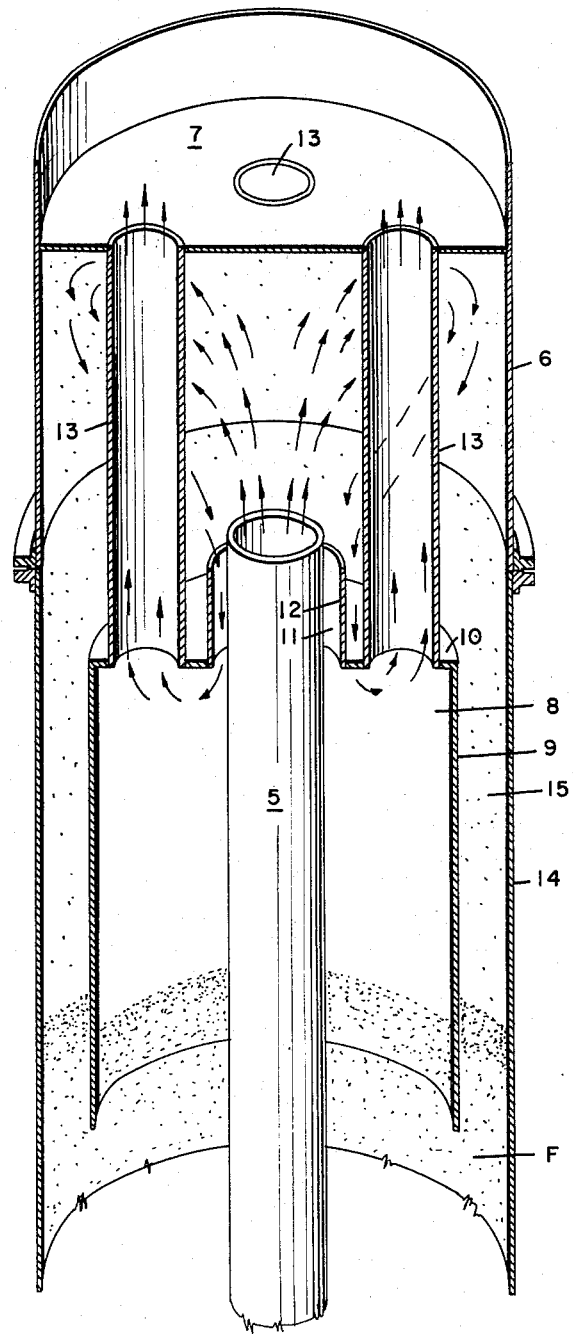
Figure 1 is a pictorial view of a vertical section through a disengager according to the invention having axially directed gas-discharge tubes and an annular solids-discharge channel.

Referring to Figure 1, the apparatus includes a lift pipe 5 through which a lift gas carrying entrained, finely subdivided solids flows upwards. The solids may be charged into the gas by any suitable or known engaging device, not shown. A bell-shaped catching hood, including a cylindrical side wall 6 which is joined at the top to a flat, horizontal top closure 7, is mounted over the top end of the lift pipe 5. The closure 7 is in alignment with the central axis of the lift pipe and spaced above the upper end thereof so as to be impinged by the free-flowing gas stream. An annular gas flow space 8 is defined between the lift pipe and a coaxial cylindrical wall 9 which is supported from an annular plate 10. This flow space communicates through a central opening in the plate 10 with an annular passageway 11 which is defined between the lift pipe and a coaxial cylindrical wall 12; the top of passageway 11 is in gas-receiving communication with the inside of the hood. Axially directed gas discharge tubes 13 are in communication with the flow space 8 through openings in the plate 10 and extend through the closure 7. These tubes are offset laterally from the lift pipe to leave a clear path for the gas stream to the central part of the closure 7 and are preferably situated at equal intervals about a circle which is concentric with the axis of the lift pipe, the intervals being large in relation to the tube diameters so as to minimize flow obstructions. A cylindrical wall 14, which is a downward extension of the side wall 6 of the hood, is coaxial with and of greater diameter than the walls 9 and 12 and defines therewith an annular solids-discharge channel 15. This channel may be connected to any suitable collector, such as a standpipe (not shown) or it may feed the solids directly into a fluidized bed, being preferably protected or sealed against the downflow of the lift gas, e.g., by means of tumbler valves or seal chambers or by being led to beneath the surface of a fluidized bed. For example, the wall 14 may serve as the side wall of a fluidization chamber containing a fluidized bed F, in which solids are maintained as a pseudo-liquid by passing gas upwards at a controlled rate which is less than that at which the solids are carried off. The wall 9 then is preferably immersed in this bed.

In operation, the lift gas and conveyed solid particles discharge from the upper end of the lift pipe 5 into the catching hood bounded by the side wall 6 and impinge against the top closure 7. As a result of the sharp reversal of flow direction of the gas stream within the hood the solid particles tend to move toward the side wall 6, whence they find their way by gravity flow into the annular solids-discharge channel 15 into the fluidized bed F. The downwardly flowing lift gas flows through the annular passageway 11 and the gas flow space 8 and escapes thence by upward flow through the gas-discharge tubes 13. It is evident that the separated solids thus fall through a channel which is isolated from the stream of purified gas, whereby re-entrainment after discharge from the catching hood is prevented. Only those particles which are entrained within the inner part of the hood are carried out with the purified gas and it was found that the quantity of such solid particles is small in comparison with the quantities present in the effluent gas with earlier arrangements in which the separated particles fell through the stream of escaping gas.

Gas escaping from the surface of the fluidized bed F inside the wall 9 flows directly into the flow space 8 while that on the outside ascends through the channel 15 and enters the hood, where it joins the lift gas.

It was further found that the pressure loss in the gas was reduced by the construction and that the relations between the diameters of the lift pipe and hood did not significantly influence the separating efficiency and pressure loss. The separating efficiency was high over a wide range of gas-solids ratios.

Figure 2:
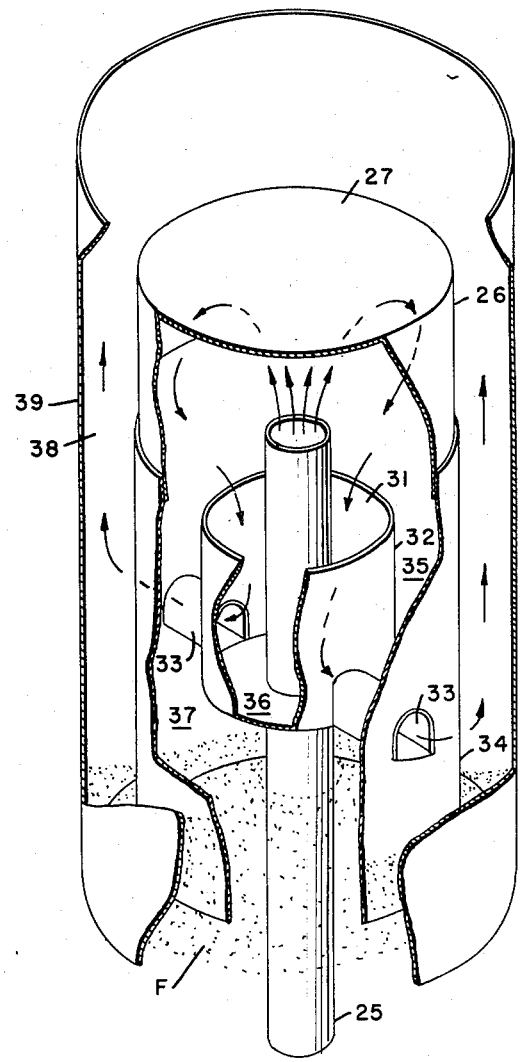
Figure 2 is a pictorial view of a second embodiment having radial gas-discharge tubes and an annular solids-discharge channel, parts being broken away.

Referring to Figure 2, wherein parts corresponding to those of the first embodiment bear reference numbers increased by twenty, the upper end of the lift pipe 25 is contained coaxially within the bell-shaped catch hood, comprising a cylindrical enclosing side wall 26 and a top closure 27, the former having a downward extension 34 which may be immersed in a fluidized bed F, as shown. A cylindrical wall 32, which surrounds the upper part of the lift tube in coaxial and spaced relation, defines therewith an annular gas passageway 31 which is closed at the bottom by an annular floor plate 36. The wall 32, which is of lesser diameter than the hood side wall 26, forms therewith or with the downward hood wall extension 34, an annular solids-discharge channel which is continued below the plate 36 as a larger annular channel 37 between the lift tube and the extension 34. Radial gas-discharge tubes 33 arranged at equal angular intervals communicate with the annular passageway 31 and extend thence out through openings in the hood wall extension 34 for discharge into an annular gas flow passage 38 defined between the hood side wall 26 or its extension and a coaxial cylindrical wall 39 of greater diameter. This wall may be the upper part of a fluidization chamber within which solids F are maintained in a fluidized state by fluidization gas passed upwards at a controlled rate.

In operation, the gas stream and solids discharging from the top end of the lift pipe 25 impinge the top closure 27, resulting in a sudden reversal of flow direction of the gas, causing the solid particles to be thrown against the side wall 26; they fall thence into the annular solid-channel 35 and from there through the channel 37. The gas flows downwards through the annular passage 31, radially out through the radial tubes 33 and thence upward through the outermost annular passage 38, in isolation from the falling particles. Gas from the fluidized bed F passing outside of the wall 34 enters the passage 38 directly, while gas ascending on the inside of the wall 38 reaches this passage via the channels 37 and 35 and the space within the hood.

Figure 3:
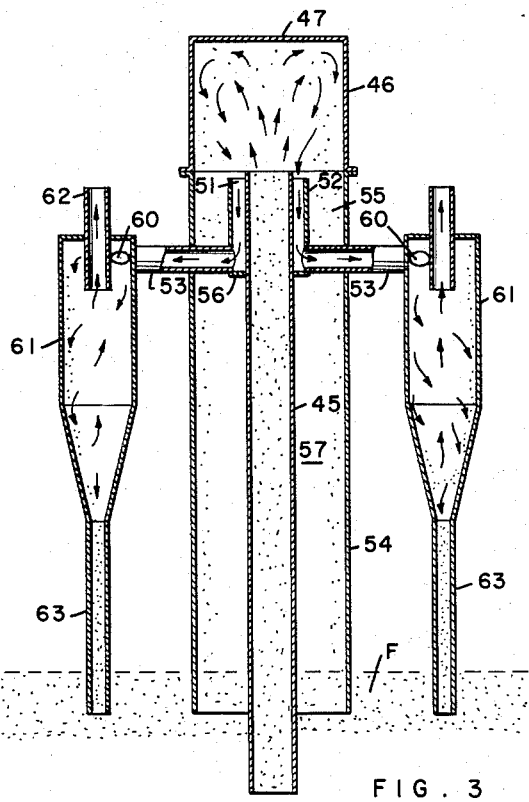
Figure 3 is a vertical sectional view through a third embodiment in which cyclones are connected to radial gas-discharge tubes.

Referring to Figure 3, wherein reference numbers increased by twenty denote parts corresponding to the second embodiment, the upper end of the lift pipe 45 discharges the gas and solids into the hood having a side wall 46 with a downward extension 54, immersed in the fluidized bed F and a top closure 47. An annular gas passage 51 is defined between the lift pipe and a cylindrical, coaxial wall 52. Inter-communicating annular solids-discharge channels 55 and 57 are formed between the hood side wall 46 or its extension 54 and the wall 52 and the lift pipe 45 respectively. The gas passage 51 is closed at the bottom by annular floor plate 56 and communicates with a plurality of radial gas tubes 53 which are distributed uniformly about the circumference of the lift pipe and extend outwards through the hood side wall extension 54. These tubes are connected to the tangential inlets 60 of cyclones 61, which are provided with overflow outlet tubes 62, extending through the top closures and with discharge pipes 63 extending into the fluidized bed F, maintained in a suitable vessel (not shown) to conduct separated solids downwards.

Operation is as was described for the third embodiment. The small amount of solid material contained in the purified gas escaping from the disengaging hood through the tubes 53 is separated in the cyclones and returned to the bed by the pipes 63 while the purified gas escapes through the tubes 62. By immersing the pipes 63 in the bed and making them of small diameters, a column of solids is maintained in each pipe and the upflow of gas from the bed directly into the cyclones is obviated.

Figure 4:
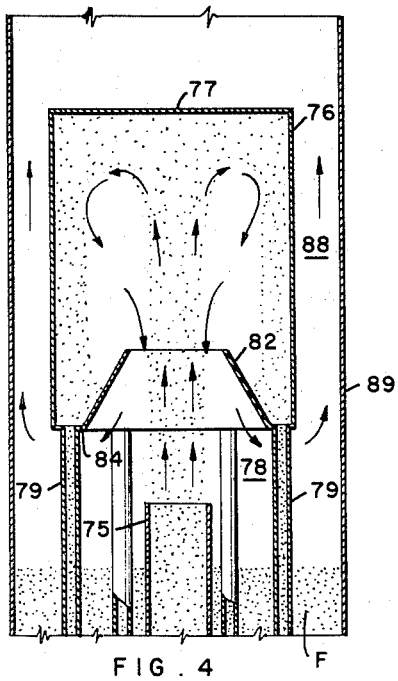
Figure 4 is a vertical sectional view through a fourth embodiment having an annular solids-collecting trough and vertical solids-discharge pipes.

In Figure 4 the disengager comprises a bell-shaped catching hood having a cylindrical side wall 76 and a top closure 77, placed above the upper end of the lift pipe 75. Within the lower part of the hood is an annular trough formed of a frusto-conical wall 82 joined to the bottom of the wall 76 by a flat annular wall 84. A plurality of vertical solids-discharge pipes 79 are mounted in solids-receiving relation to the trough through openings in the wall 84 and are spaced at equal circumferential intervals. These pipes extend down into the fluidized bed F which is maintained within a cylindrical wall 89. The upper extension of wall 89 is coaxial with the wall 76 and of greater diameter to define therewith an annular gas passage 88. This passage is in free communication with the inside of the hood via the gaps between the pipes 79 and the large central opening inside the trough wall 82.

In operation the lift gas and conveyed solid particles discharging from the top of the lift pipe 75 enter the hood and impinge the top closure 77, as shown in the drawing, resulting in a sudden reversal of the gas flow direction and the outward movement of the solid particles to the wall 76, whence they fall into the trough. The particles then fall through the pipes 79 and are conveyed thereby into the fluidized bed F in isolation from the purified gas. The latter flows downwards through the central opening in the trough wall as an annular stream surrounding the entering stream, flows thence outward under the bottom edge of the hood wall 76 and up through the passage 88.

The advantages of the last three embodiments are as stated for the first.

*Example*

A disengager (Model A) constructed as shown in Figure 4, having a hood 16.7 cm. in diameter, was mounted above a 1.5-inch diameter lift pipe. Spent catalyst particles having a mean diameter of 55 microns were engaged in air in various mass ratios and the resultant air-solids stream was passed through the lift pipe at a superficial air velocity of 15 meters per second. The results are shown in the following table.

For comparison, like test runs were performed on a disengager (Model B), constructed like Model A but without the trough and downcomer pipes.

| Solids to Gas Ratio | Model A | | Model B | |
|---|---|---|---|---|
| | Separating Efficiency | Pressure Loss | Separating Efficiency | Pressure Loss |
| 10 | 97.8 | 0.9 | 91.7 | 1.4 |
| 20 | 98.6 | 1.3 | 92.9 | 2.2 |
| 30 | 98.8 | 1.8 | 93.4 | 3.0 |
| 40 | 98.9 | 2.3 | 93.2 | 3.9 |

The solids to gas ratios are given as weight ratios and the pressure losses in terms of $0.5\ dv^2$ where $d$ is the density and $v$ the velocity of the gas stream in meters per second.

The data show that Model A, according to the invention, gave significantly higher separating efficiencies and lower pressure drops than Model B, having the same physical dimensions but not provided with the solids-discharge pipes.

I claim as my invention:

1. A gas-solids disengager for separating conveyed solid particles from an upwardly directed stream of lift gas discharging from the upper end of a lift pipe comprising a hood situated at least in part above said end and including a vertically elongated confining side wall joined at the top to a top closure which is spaced above said end in alignment with the stream for impingement thereby, said hood having a central bottom opening for the upward admission of said stream and separate downwardly extending gas-discharge and solids-discharge passageways for discharging gas and solids, respectively, from the hood after reversal of flow direction within the hood interiorly of said side wall, including a wall which separates said passageways only below a level substantially below said top closure.

2. A disengager according to claim 1 wherein said solids-discharge passageway includes an annular wall which is coaxial with and of greater diameter than said lift tube and defines the outer boundary of said passageway, the said passageway being annular in form.

3. A disengager according to claim 2 wherein said annular wall is a downward extension of the said side wall of the hood.

4. A disengager according to claim 1 wherein said gas-discharge passageway includes an annular channel defined by the lift tube and a cylindrical wall which is coaxial with the lift tube and of diameter intermediate the diameters of the hood and lift tube, said channel being in gas-receiving communication with the inside of the hood at the top.

5. A disengager according to claim 1 wherein said gas-discharge passageway includes a gas-discharge tube in communication with the inside of the hood.

6. A disengager according to claim 5 including a plurality of gas-discharge tubes, said tubes being arranged substantially parallel to and offset laterally from the lift tube and extending upwards through the top closure of the hood.

7. A disengager according to claim 5 including a plurality of gas-discharge tubes, said tubes being arranged generally radially and extending through the side wall of the hood at points distributed substantially equally about the periphery thereof.

8. A disengager according to claim 5 wherein said gas-discharge tube is arranged generally radially and extends through the side wall of the hood, in combination with a cyclone separator having the inlet thereof connected to the outer end of the tube.

9. A disengager according to claim 1 wherein said solids-discharge passageway includes a solids pipe the upper end of which is situated within the hood below the top of the said gas-discharge passageway, and means for directing solids within the hood into the said solids pipe.

10. A disengager according to claim 9 including a plurality of solids pipes distributed uniformly about the lift pipe.

11. A disengager according to claim 1 including an annular solids-collecting trough at the inner side of the confining side wall of the hood at a level substantially below said top closure and near the top of said gas-discharge passageway, and a plurality of substantially vertical solids pipes which extend downwards from said trough and are in solids-receiving relation thereto.

12. A disengager according to claim 11 wherein said trough includes an annular wall which is inclined upwards toward the axis of the lift pipe and an annular floor joining said annular wall to the side wall of the hood.

References Cited in the file of this patent
UNITED STATES PATENTS

| | | |
|---|---|---|
| 1,514,441 | Culp | Nov. 4, 1924 |
| 2,129,490 | Buchs | Sept. 6, 1938 |
| 2,646,316 | Kollgaard | July 21, 1953 |
| 2,666,731 | Bergstrom | Jan. 19, 1954 |
| 2,717,181 | Snow | Sept. 6, 1955 |